(12) United States Patent
Clayton-Smith et al.

(10) Patent No.: US 12,531,852 B2
(45) Date of Patent: Jan. 20, 2026

(54) SYSTEM, METHOD, AND COMPUTER PROGRAM FOR OAuth OR OIDC OPTIMIZED REGISTRATION

(71) Applicant: JPMorgan Chase Bank, N.A., New York, NY (US)

(72) Inventors: Neill Clayton-Smith, Claymont, DE (US); Vikrant Kshirsagar, Westerville, OH (US); Parul Patidar, Jamesburg, NJ (US); Prasad Kulkarni, Jersey City, NJ (US); Alain Demour, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 78 days.

(21) Appl. No.: 18/441,687

(22) Filed: Feb. 14, 2024

(65) Prior Publication Data
US 2024/0283785 A1   Aug. 22, 2024

Related U.S. Application Data

(60) Provisional application No. 63/446,145, filed on Feb. 16, 2023.

(51) Int. Cl.
*H04L 9/40* (2022.01)
*G06F 21/46* (2013.01)

(52) U.S. Cl.
CPC ............ *H04L 63/083* (2013.01); *G06F 21/46* (2013.01); *H04L 63/0428* (2013.01)

(58) Field of Classification Search
CPC .... H04L 63/083; H04L 63/0428; G06F 21/46
See application file for complete search history.

(56) References Cited

U.S. PATENT DOCUMENTS

| | | | |
|---|---|---|---|
| 11,140,146 B2 * | 10/2021 | Suraparaju | H04L 63/0807 |
| 11,843,611 B2 * | 12/2023 | Pattar | H04L 63/083 |
| 2020/0013117 A1 * | 1/2020 | Mathwig | G06Q 40/02 |
| 2020/0137050 A1 * | 4/2020 | Reddimasi | H04W 12/12 |

* cited by examiner

*Primary Examiner* — Chau Le
(74) *Attorney, Agent, or Firm* — GREENBLUM & BERNSTEIN, P.L.C.

(57) ABSTRACT

Various methods, apparatuses/systems, and media for optimizing user experience for a customer who is interacting with an authorization server are disclosed. A resource server provides corresponding context information when passing the customer to an authorization server. The context information is used by the authorization server to identify the customer in context, and once identified, the authorization server determines whether the customer has credentials or not. When it is determined that the customer is not a new customer and has credentials, he/she is prompted to login. When it is determined that the customer is a new customer, he/she is prompted to create an account first and then create digital identity and associated credentials. Existing customer without credentials is prompted to follow a registration flow to provision credentials. Once credentials have been created, the customer is automatically logged in and the authorization flow continues to a consent step for completing a transaction.

20 Claims, 6 Drawing Sheets

SYSTEM, METHOD, AND COMPUTER PROGRAM FOR OAuth OR OIDC OPTIMIZED REGISTRATION

CROSS-REFERENCE TO RELATED APPLICATIONS

This application claims the benefit of priority from U.S. Provisional Patent Application No. 63/446,145, filed Feb. 16, 2023, which is herein incorporated by reference in its entirety.

TECHNICAL FIELD

This disclosure generally relates to user authentication and credentials management, and, more particularly, to methods and apparatuses for implementing an OAuth or OpenID Connect (OIDC) optimized registration module configured to optimize user experience for a customer.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to user authentication, identity management, data processing, data migration, monitoring, performance analysis, project tracking, data management, and competitive analysis, to name but a few. Typical identity management describes the management of user identities, their authentication, authorization, roles, and privileges within or across system and enterprise boundaries with the goal of increasing security and productivity while decreasing cost, downtime, and repetitive tasks. One standard that may be particularly useful in the field of identity management is OAuth.

OAuth is an open standard for authorization. It is well known that an indirect effect of authorization is authentication. OAuth may allow users/customers to share their private resources (e.g., photos, videos, contact lists, etc.) stored on one site with another site without having to hand out their credentials, typically supplying username and password tokens instead. Each token may grant access to a specific site for specific resources and for a defined duration. Thus, a user/customer may grant a third party site access to their information stored with another service provider, without sharing their access permissions or the full extent of their data. OpenID Connect (OIDC) is a simple identity layer on top of the OAuth protocol. OIDC may allow users/customers to verify the identity of the end-user based on the authentication performed by an authorization server, as well as to obtain basic profile information about the end-user in an interoperable and REST-like manner.

Typically, in the OAuth and OIDC, the flow for authentication or authorization (authorization code grant) assumes a user/customer already has credentials. The general flow in the OAuth and OIDC may include the following sequential steps: i) external party transfers to authorization server; ii) authorization server allows user/customer to login; iii) authorization server obtains consent from user/customer; and iv) control is returned to external party with tokens for API access or authentication verification.

However, the specifications of OAuth and OIDC are silent on how the user/customer obtains credentials in step ii), and generally these happen through an existing registration flow prior to this authorization flow. Thus, this conventional process results in a poor experience for a user/customer who doesn't have credentials and lands on this authorization flow. An OIDC extension may touch on this problem, but comes up with a different solution that is still not optimal to resolve the poor experience for a user/customer who doesn't have credentials.

Thus, there is a need for advanced flow that may address the deficiencies of the conventional flow and optimize user experience for a customer who is interacting with an authorization server for the first time.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic OAuth or OIDC optimized registration module configured to optimize user experience for a customer who is interacting with an authorization server for the first time, reduce customer friction, and establish early engagement for customers who do not have credentials to complete a registration flow to provision credentials, but the disclosure is not limited thereto. The term "credentials" as disclosed herein may correspond to "digital identity and associated credentials" without departing from the scope of the instant invention. Thus, credentials creation/management as disclosed herein may also correspond to digital identity and associated credentials creation/management.

According to exemplary embodiments, a method for optimizing user experience during interaction with an authorization server by utilizing one or more processors along with allocated memory is disclosed. The method may include: establishing a communication link between a client and an authorization server via a communication network, wherein a resource server provides context information associated with a customer; receiving, at the authorization server, a request for customer consent to access the resource server from a client application in response to receiving a request from the customer; identifying the customer, by the authorization server, based on the context information; and detecting, by the authorization server, in response to identifying, whether the customer has digital credentials or not.

According to exemplary embodiments, when it is determined that the customer is an existing customer and has digital credentials, the method may further include: prompting the customer to login to an authentication server using the customer's digital credentials; digitally executing an electronic data sharing agreement between the customer and a service provider of the customer application as to how to share information; receiving, at the authorization server, a consent from the customer based on verifying that the customer's digital credentials are correct to login to the authentication server; generating token data for the client application, based on the received consent, to access the resource server. In a subsequent step the client application may, by using the token, access the resource server for any data or transactions consented to by the customer.

According to exemplary embodiments, when it is determined that the customer is an existing customer for the customer application who does not have digital credentials, the method may further include: prompting the customer to complete a registration process to create digital credentials by selecting a user identification and a password; automatically login the customer once it is determined that the digital credentials have been created; executing an electronic data sharing agreement that binds the customer and a service provider of the customer application as to how to share information; receiving, at the authorization server, a consent from the customer based on verifying that the customer's created digital credentials are correct to login to the authentication; generating token data for the client application, based on the received consent, to access the resource server. In a subsequent step the client application may, by using the token, access the resource server for any data or transactions consented to by the customer.

According to exemplary embodiments, the authorization server may be an OAuth authorization server including one or more hardware processors and memories.

According to exemplary embodiments, the method may further include: implementing an OIDC protocol to login.

According to exemplary embodiments, the method may further include: encrypting Payload data contained in the token data by using preset authentication information; and transmitting the encrypted token data to the client application.

According to exemplary embodiments, the method may further include: receiving the encrypted token data through the client application; decrypting the encrypted token data by using preset authentication information; and analyzing the Payload data in the encrypted token data for use, and responding to successful login to the customer application.

According to exemplary embodiments, the digital credentials may include user login and password or biometric identifier associated with the customer.

According to exemplary embodiments, a system for optimizing user experience during interaction with an authorization server is disclosed. The system may include: a processor; and a memory operatively connected to the processor via a communication interface, the memory storing computer readable instructions, when executed, may cause the processor to: establish a communication link between a client and an authorization server via a communication network, wherein a resource server provides context information associated with a customer; receive, at the authorization server, a request for customer consent to access the resource server from a client application in response to receiving a request from the customer; identify the customer, by the authorization server, based on the context information; and detect, by the authorization server, in response to identifying, whether the customer has digital credentials or not.

According to exemplary embodiments, when it is determined that the customer is an existing customer for the customer application and has digital credentials, the system may further include: prompt the customer to login to an authentication server using the customer's digital credentials; receive, at the authorization server, a consent from the customer based on verifying that the customer's digital credentials are correct to login to the authentication server; generate token data for the client application, based on the received consent, to access the resource server. . The client application may, by using the token, access the resource server for any data or transactions consented to by the customer.

According to exemplary embodiments, when it is determined that the customer is an existing customer for the customer application who does not have digital credentials, the system may further include: prompt the customer to complete a registration process to create digital credentials by selecting a user identification and a password; automatically login the customer once it is determined that the digital credentials have been created; execute an electronic data sharing agreement that binds the customer and a service provider of the customer application as to how to share information; receive, at the authorization server, a consent from the customer based on verifying that the customer's created digital credentials are correct to login to the authentication server; generate token data for the client application, based on the received consent, to access the resource server. The client application may, by using the token, access the resource server for any data or transactions consented to by the customer.

According to exemplary embodiments, the processor may be further configured to: implement an OIDC protocol to login.

According to exemplary embodiments, the processor may be further configured to: encrypt Payload data contained in the token data by using preset authentication information; and transmit the encrypted token data to the client application.

According to exemplary embodiments, the processor may be further configured to: receive the encrypted token data through the client application; decrypt the encrypted token data by using preset authentication information; and analyze the Payload data in the encrypted token data for use, and respond to successful login to the customer application.

According to exemplary embodiments, a non-transitory computer readable medium configured to store instructions for optimizing user experience during interaction with an authorization server is disclosed. The instructions, when executed, may cause a processor to perform the following: establishing a communication link between a client and an authorization server via a communication network, wherein a resource server provides context information associated with a customer; receiving, at the authorization server, a request for customer consent to access the resource server from a client application in response to receiving a request from the customer; identifying the customer, by the authorization server, based on the context information; and detecting, by the authorization server, in response to identifying, whether the customer has digital credentials or not.

According to exemplary embodiments, when it is determined that the customer is an existing customer for the customer application and has digital credentials, the instructions, when executed, may further cause the processor to perform the following: prompting the customer to login to an authentication server using the customer's digital credentials; digitally executing an electronic data sharing agreement between the customer and a service provider of the customer application as to how to share information; receiving, at the authorization server, a consent from the customer based on verifying that the customer's digital credentials are correct to login to the authentication server; generating token data for the client application, based on the received consent, to access the resource server. The client application may, by using the token, access the resource server for any data or transactions consented to by the customer.

According to exemplary embodiments, when it is determined that the customer is an existing customer for the customer application who does not have digital credentials, the instructions, when executed, may further cause the processor to perform the following: prompting the customer to complete a registration process to create digital credentials for the customer to login to the authentication server; automatically login the customer once it is determined that the digital credentials have been created; executing an electronic data sharing agreement that binds the customer and a service provider of the customer application as to how to share information; receiving, at the authorization server, a consent from the customer based on verifying that the customer's created digital credentials are correct to login to the authentication server; generating token data for the client application, based on the received consent, to access the resource server.

According to exemplary embodiments, the instructions, when executed, may cause the processor to further perform the following: implementing an OIDC protocol to login.

According to exemplary embodiments, the instructions, when executed, may cause the processor to further perform the following: encrypting Payload data contained in the token data by using preset authentication information; and transmitting the encrypted token data to the client application.

According to exemplary embodiments, the instructions, when executed, may cause the processor to further perform the following: receiving the encrypted token data through the client application; decrypting the encrypted token data by using preset authentication information; and analyzing the Payload data in the encrypted token data for use, and responding to successful login to the customer application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
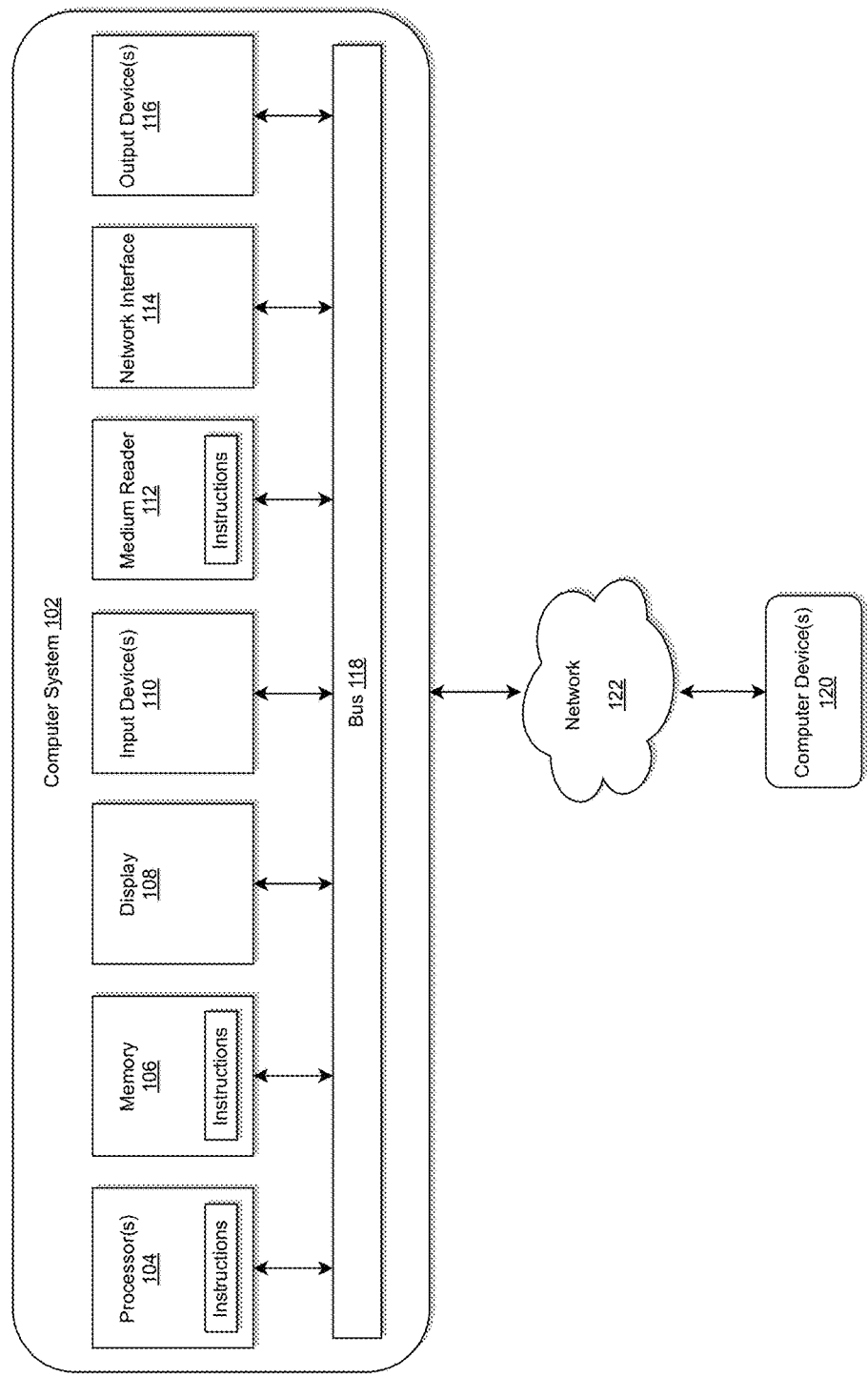
FIG. 1 illustrates a computer system for implementing a platform, language, database, and cloud agnostic OAuth or OIDC optimized registration module configured to optimize user experience for a customer who is interacting with an authorization server in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic OAuth or OIDC optimized registration module configured to optimize user experience for a customer who is interacting with an authorization server in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the OAuth or OIDC optimized registration module may be platform, language, database, and cloud agnostic that may allow for consistent easy orchestration and passing of data through various components to output a desired result regardless of platform, language, database, and cloud environment. Since the disclosed process, according to exemplary embodiments, is platform, language, database, and cloud agnostic, the OAuth or OIDC optimized registration module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
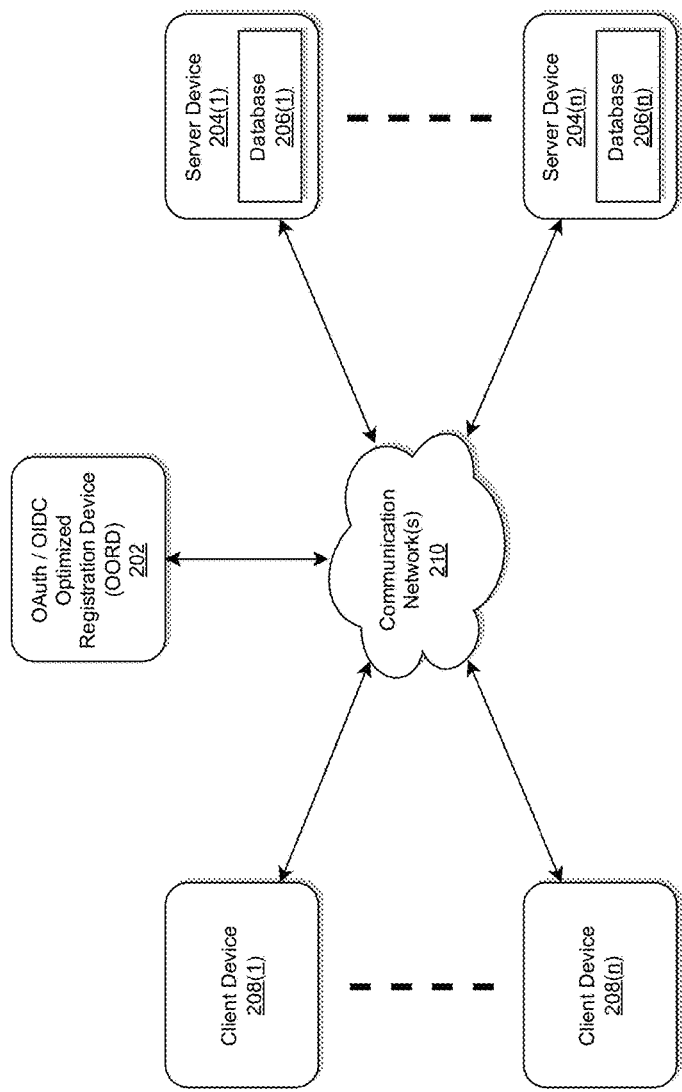
FIG. 2 illustrates an exemplary diagram of a network environment with a platform, language, database, and cloud agnostic OAuth or OIDC optimized registration device in accordance with an exemplary embodiment.

Referring to FIG. 2, a schematic of an exemplary network environment 200 for implementing a language, platform, database, and cloud agnostic OAuth or OIDC optimized registration device (OORD) of the instant disclosure is illustrated.

According to exemplary embodiments, the above-described problems associated with conventional tools may be overcome by implementing an OORD 202 as illustrated in FIG. 2 that may be configured for implementing a platform, language, cloud, and database agnostic OAuth or OIDC optimized registration module configured to optimize user experience for a customer who is interacting with an authorization server for the first time, reduce customer friction, and establish early engagement for customers who do not have credentials to complete a registration flow to provision credentials, but the disclosure is not limited thereto.

The OORD 202 may be the same or similar to the computer system 102 as described with respect to FIG. 1.

The OORD 202 may store one or more applications that can include executable instructions that, when executed by the OORD 202, cause the OORD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OORD 202 itself, may be located in virtual server(s) running in a cloud-based computing environment rather than being tied to one or more specific physical network computing devices. Also, the application(s) may be running in one or more virtual machines (VMs) executing on the OORD 202. Additionally, in one or more embodiments of this technology, virtual machine(s) running on the OORD 202 may be managed or supervised by a hypervisor.

In the network environment 200 of FIG. 2, the OORD 202 is coupled to a plurality of server devices 204(1)-204(n) that hosts a plurality of databases 206(1)-206(n), and also to a plurality of client devices 208(1)-208(n) via communication network(s) 210. A communication interface of the OORD 202, such as the network interface 114 of the computer system 102 of FIG. 1, operatively couples and communicates between the OORD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OORD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OORD 202 may be a standalone device or integrated with one or more other devices or apparatuses, such as one or more of the server devices 204(1)-204(n), for example. In one particular example, the OORD 202 may be hosted by one of the server devices 204(1)-204(n), and other arrangements are also possible. Moreover, one or more of the devices of the OORD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the OORD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the OORD 202 that may efficiently provide a platform for implementing a platform, language, cloud, and database agnostic OAuth or OIDC optimized registration module configured to optimize user experience for a customer who is interacting with an authorization server for the first time, reduce customer friction, and establish early engagement for customers who do not have credentials to complete a registration flow to provision credentials, but the disclosure is not limited thereto.

The client devices 208(1)-208(n) may run interface applications, such as standard web browsers or standalone client applications, which may provide an interface to communicate with the OORD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the OORD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the OORD 202, the server devices 204(1)-204(n), or the client devices 208(1)-208(n), for example, may be configured to operate as virtual instances on the same physical machine. For example, one or more of the OORD 202, the server devices 204(1)-204(n), or the client devices 208(1)-208(n) may operate on the same physical device rather than as separate devices communicating through communication network(s) 210. Additionally, there may be more or fewer OORDs 202, server devices 204(1)-204(n), or client devices 208(1)-208(n) than illustrated in FIG. 2. According to exemplary embodiments, the OORD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
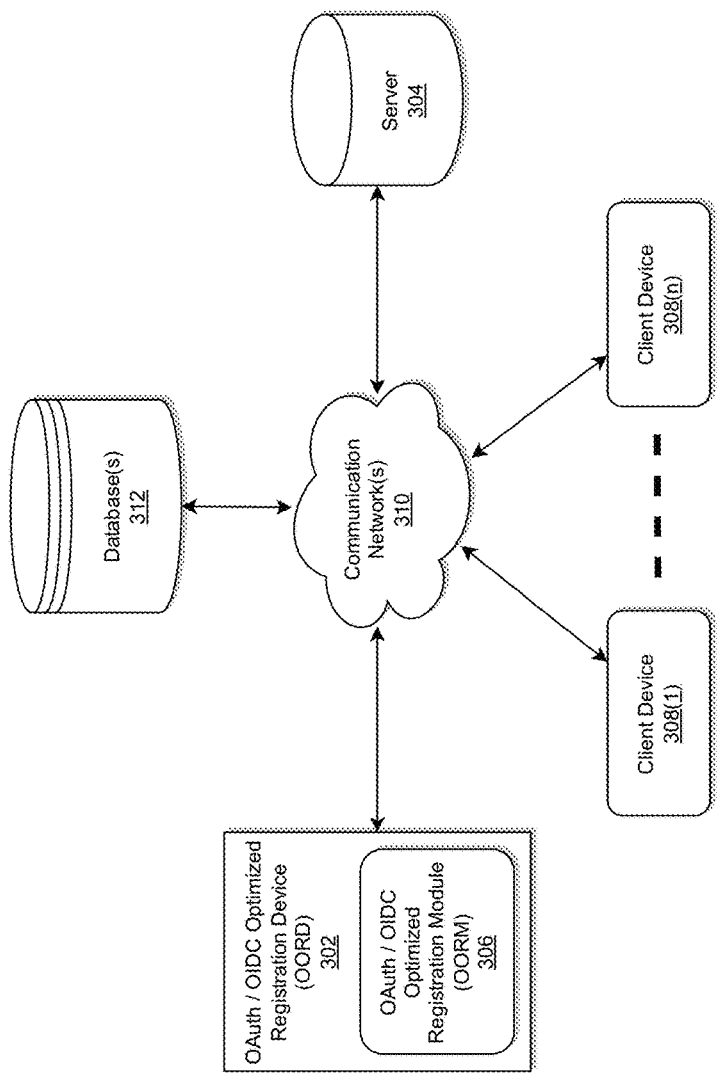
FIG. 3 illustrates a system diagram for implementing a platform, language, database, and cloud agnostic OAuth or OIDC optimized registration device having a platform, language, database, and cloud agnostic OAuth or OIDC optimized registration module in accordance with an exemplary embodiment.

FIG. 3 illustrates a system diagram for implementing a platform, language, and cloud agnostic OORD having a platform, language, database, and cloud agnostic OAuth or OIDC optimized registration module (OORM) in accordance with an exemplary embodiment.

As illustrated in FIG. 3, the system 300 may include an OORD 302 within which an OORM 306 is embedded, a server 304, a database(s) 312, a plurality of client devices 308(1) . . . 308(n), and a communication network 310.

According to exemplary embodiments, the OORD 302 including the OORM 306 may be connected to the server 304, and the database(s) 312 via the communication network 310. The OORD 302 may also be connected to the plurality of client devices 308(1) . . . 308(n) via the communication network 310, but the disclosure is not limited thereto.

According to exemplary embodiment, the OORD 302 is described and shown in FIG. 3 as including the OORM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the OORM 306 may be configured to receive real-time feed of data from the plurality of client devices 308(1) . . . 308(n) and secondary sources via the communication network 310.

As may be described below, the OORM 306 may be configured to: establish a communication link between a client and an authorization server via a communication network, wherein a resource server provides context information associated with a customer; receive, at the authorization server, a request for customer consent to access the resource server from a client application in response to receiving a request from the customer; identify the customer, by the authorization server, based on the context information; and detect, by the authorization server, in response to identifying, whether the customer has digital credentials or not.

According to exemplary embodiments, when it is determined that the customer is an existing customer for the customer application and has digital credentials, the OORM 306 may be configured to: prompt the customer to login to an authentication server using the customer's digital credentials; receive, at the authorization server, a consent from the customer based on verifying that the customer's digital credentials are correct to login to the authentication server; generate token data for the client application, based on the received consent, to access the resource server. The client application may, by using the token, access the resource server for any data or transactions consented to by the customer.

According to exemplary embodiments, when it is determined that the customer is an existing customer for the customer application who does not have digital credentials, the OORM 306 may be configured to: prompt the customer to complete a registration process to create digital credentials by selecting a user identification and a password; automatically login the customer once it is determined that the digital credentials have been created; execute an electronic data sharing agreement that binds the customer and a service provider of the customer application as to how to share information; receive, at the authorization server, a consent from the customer based on verifying that the customer's created digital credentials are correct to login to the authentication server; generate token data for the client application, based on the received consent, to access the resource server. The client application may, by using the token, access the resource server for any data or transactions consented to by the customer.

The plurality of client devices 308(1) . . . 308(n) are illustrated as being in communication with the OORD 302. In this regard, the plurality of client devices 308(1) . . . 308(n) may be "clients" (e.g., customers) of the OORD 302 and are described herein as such. Nevertheless, it is to be known and understood that the plurality of client devices 308(1) . . . 308(n) need not necessarily be "clients" of the OORD 302, or any entity described in association therewith herein. Any additional or alternative relationship may exist between either or both of the plurality of client devices 308(1) . . . 308(n) and the OORD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the OORD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The OORD 302 may be the same or similar to the OORD 202 as described with respect to FIG. 2, including any features or combination of features described with respect thereto.

Figure 4:
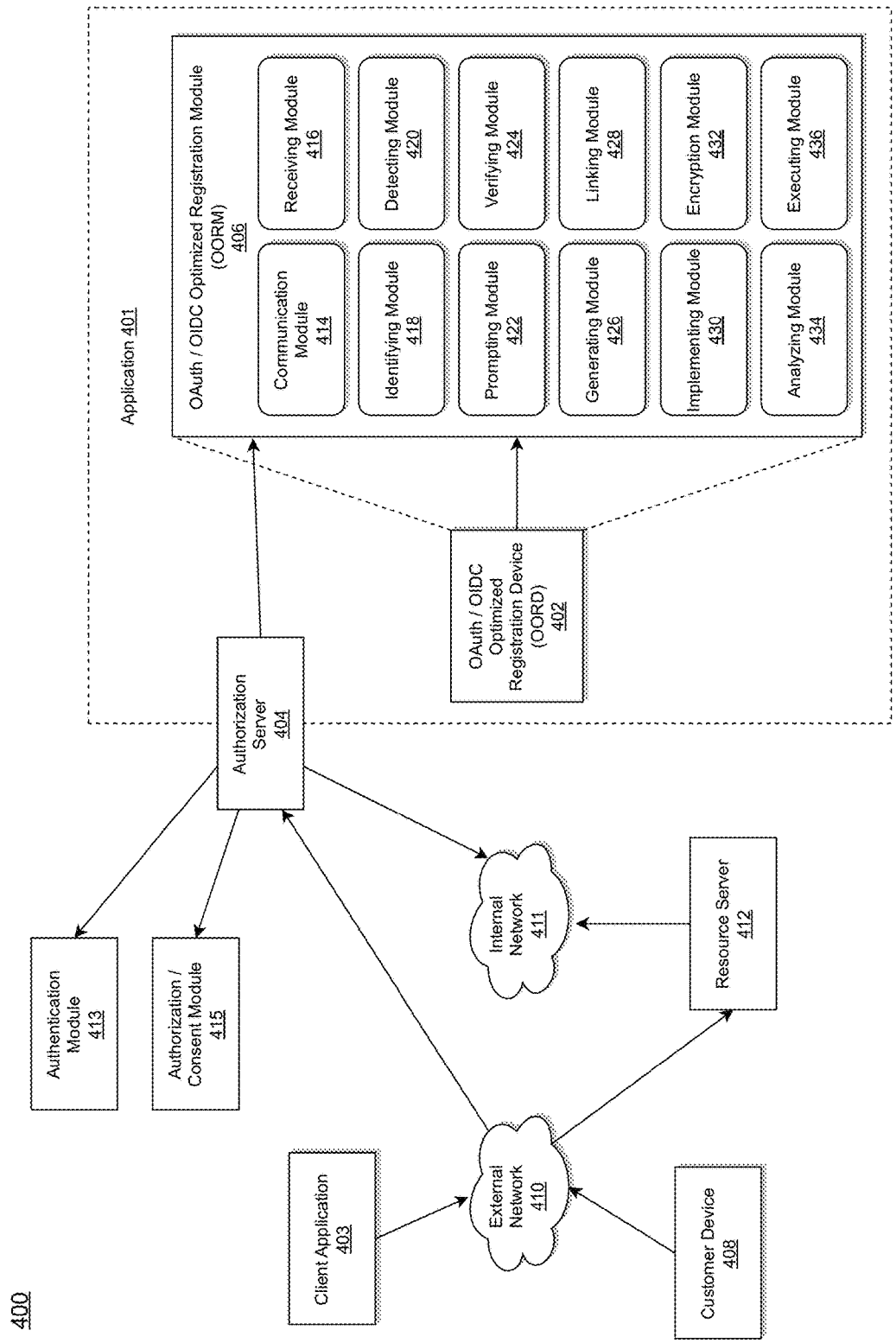
FIG. 4 illustrates a system diagram for implementing a platform, language, database, and cloud agnostic OAuth or OIDC optimized registration module of FIG. 3 in accordance with an exemplary embodiment.

FIG. 4 illustrates a system diagram for implementing a platform, language, database, and cloud agnostic OORM of FIG. 3 in accordance with an exemplary embodiment.

According to exemplary embodiments, the system 400 may include a platform, language, database, and cloud agnostic OORD 402 within which a platform, language, database, and cloud agnostic OORM 406 is embedded, an application 403, an authorization server 404, an external network 410, an internal network 411, a resource server 412, an authentication module 413, and an authorization/consent module 415. According to exemplary embodiments, authorization server 404 may comprise a plurality of servers located centrally or located in different locations, but the disclosure is not limited thereto. According to exemplary embodiments, the authorization server 404 may be an authorization server, such as OAuth server. The OORD 402 including the OORM 406 may be components of an application 401.

According to exemplary embodiments, the OORD 202, 302, and 402 as illustrated in FIGS. 2, 3, and 4, respectively, may be a part of the authorization server 404 without departing from the scope of the present disclosure. A customer interacting by utilizing the customer device 408 with the authorization server 404 via their browser/mobile application and what may be referred to as the 'client' in the OAuth specification, which may be a company/partner that is relying on the authorization server 404 to provide customer authorization to access resources.

Figure 6:
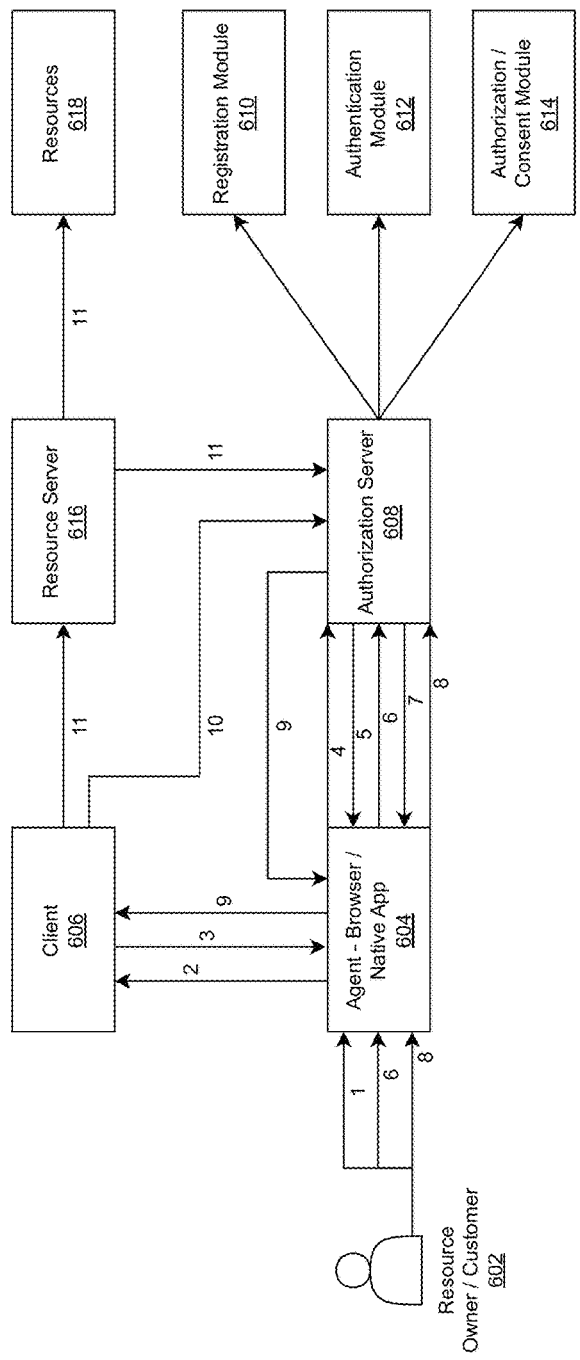
FIG. 6 illustrates an exemplary flow diagram of accessing resources implemented by the platform, language, database, and cloud agnostic OAuth or OIDC optimized registration module of FIG. 4 in accordance with an exemplary embodiment.

According to exemplary embodiments, the external network 410 may be embedded between the client application 403 and the customer device 408. The internal network 411 may be embedded between the authorization server 404 and the resource server 412. According to exemplary embodiments, resource server 412 may include one or more resource servers that store customer context information. Thus, the resource server 412 may be similar to the resource server 616 as illustrated in FIG. 6.

According to exemplary embodiments, as illustrated in FIG. 4, the OORM 406 may include a communication module 414, a receiving module 416, an identifying module 418, a detecting module 420, a prompting module 422, a verifying module 424, a generating module 426, a linking module 428, an implementing module 430, an encrypting module 432, an analyzing module 434, and an executing module 436. According to exemplary embodiments, interactions and data exchange among these modules included in the OORM 406 provide the advantageous effects of the disclosed invention. Functionalities of each module of FIG. 4 may be described in detail below with reference to FIGS. 4-5.

According to exemplary embodiments, each of the communication module 414, the receiving module 416, the identifying module 418, the detecting module 420, the prompting module 422, the verifying module 424, the generating module 426, the linking module 428, the implementing module 430, the encrypting module 432, the analyzing module 434, and the executing module 436 of the OORM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the communication module 414, the receiving module 416, the identifying module 418, the detecting module 420, the prompting module 422, the verifying module 424, the generating module 426, the linking module 428, the implementing module 430, the encrypting module 432, the analyzing module 434, and the executing module 436 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the communication module 414, the receiving module 416, the identifying module 418, the detecting module 420, the prompting module 422, the verifying module 424, the generating module 426, the linking module 428, the implementing module 430, the encrypting module 432, the analyzing module 434, and the executing module 436 of the OORM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the communication module 414, the receiving module 416, the identifying module 418, the detecting module 420, the prompting module 422, the verifying module 424, the generating module 426, the linking module 428, the implementing module 430, the encrypting module 432, the analyzing module 434, and the executing module 436 of the OORM 406 of FIG. 4 may be called via corresponding API.

According to exemplary embodiments, the communication module 414 may be configured to establish a communication link between an authorization server, i.e., authorization server 404, and a resource server, i.e., within resource server 412, via a communication network, wherein the resource server provides context information associated with a customer. The receiving module 416 may be configured to receive, at the authorization server 404, a request to access the resource server 412 from a client application 403 in response to receiving a request from the customer to complete a transaction corresponding to a product offered at a website linked to the client application 403. The identifying module 418 may be configured to identify the customer, by the authorization server 404, based on the context information. The detecting module 420 may be configured to detect, by the authorization server 404, in response to identifying, whether the customer has digital credentials or not.

According to exemplary embodiments, the digital credentials may include user login and password or biometric identifier associated with the customer, but the disclosure is not limited thereto. According to exemplary embodiments, the authorization server 404 may be an OAuth authorization server including one or more hardware processors and memories. The authorization server 404 may be similar to the authorization server 608 as illustrated in FIG. 6.

According to exemplary embodiments, when it is determined by the detecting module 420 that the customer is an existing customer for the application 401 and has digital credentials to access the resource server 412, the prompting module 422 may be configured to prompt, from the same platform as the OORM 406, the customer to login to an authentication server via the authentication module 413 using the customer's digital credentials; the receiving module 416 may be configured to receive, at the authorization server 404, a consent via the authorization/consent module 415 from the customer based on verifying by the verifying module 424 that the customer's digital credentials are correct to login to the authentication server; the generating module 426 may be configured to generate token data for the client application 403, based on the received consent, to access the resource server 412. The client application 403 may, by using the token, access the resource server 412 for any data or transactions consented to by the customer. For example, the linking module 428 may be configured to link, by utilizing the token data, the client application 403 to the resource server 412; and the executing module 436 may be configured to automatically complete, in response to linking, the transaction corresponding to the product.

According to exemplary embodiments, when it is determined by the detecting module 420 that the customer is an existing customer for the application 401 who does not have digital credentials to access the resource server 412, the prompting module 422 may be configured to prompt, from the same platform as the OORM 406, the customer to complete a registration process to create digital credentials by selecting a user identification and a password; the executing module 436 may be configured to automatically login the customer to login to the resource server 412 once it is determined that the digital credentials have been created; the executing module 436 may be configured to execute an electronic data sharing agreement that binds the customer and a service provider of the application 401, i.e., a bank, as to how to share information and the resource server 412; the receiving module 416 may be configured to receive, at the authorization server 404, a consent from the customer based on verifying by the verifying module 424 that the customer's created digital credentials are correct to login to the authentication server; the generating module 426 may be configured to generate token data for the client application 403, based on the received consent, to access the resource server. The client application 403 may, by using the token, access the resource server 412 for any data or transactions consented to by the customer. For example, the linking module 428 may be configured to link, by utilizing the token data, the client application 403 to the resource server 412; and the executing module 436 may be configured to automatically complete, in response to linking, the transaction corresponding to the product.

According to exemplary embodiments, when it is determined by the detecting module 420 that the customer is not an existing customer for the application 401 to access the resource server 412, the prompting module 422 may be configured to prompt, from the same platform as the OORM 406, the customer to complete a registration process to select a user identification and a password and create digital identity and associated credentials for the customer to login to the resource server 412 based on the user identification and the password; the executing module 436 may be configured to automatically login the customer to the application 401 once it is determined that the digital identity and associated credentials have been created; the executing module 436 may be further configured to digitally execute a data sharing agreement between the customer and a service provider of the application 401 and the resource server 412 as to how to share information; the receiving module 416 may be configured to receive, at the authorization server 404, a consent from the customer based on verifying by the verifying module 424 that the customer's created digital identity and associated credentials are correct to login to the resource server 412; the generating module 426 may be configured to generate the token data for the client application 403, based on the received consent, to access the resource server 412 to obtain the context information associated with the customer; the linking module 428 may be configured to link, by utilizing the token data, the client application 403 to the resource server 412; and the executing module 436 may be configured to automatically complete, in response to the linking, the transaction corresponding to the product.

According to exemplary embodiments, in access management, "credentials" in the digital authorization context may mean "ways to prove a user's identity", e.g., password, passkeys, or other factors of authentication, etc. A digital identity may correspond to the recorded set of measurable characteristics by which a computer may identify an external entity. That entity may be a person, an organization, a software program, or another computer. And digital identity may exist independently of whatever style of credentials one choses to layer on the top of it and may support multiple forms of credentials, but the disclosure is not limited thereto.

According to exemplary embodiments, the implementing module 430 may be configured to implement an OIDC protocol to login.

According to exemplary embodiments, the encrypting module 432 may be configured to encrypt Payload data contained in the token data by using preset authentication information; and the communication module 414 may be configured to transmit the encrypted token data to the client application 403.

According to exemplary embodiments, the receiving module 416 may be further configured to receive the encrypted token data through the client application 403; the encrypting module 432 may be configured to decrypt the encrypted token data by using preset authentication information; and the analyzing module 434 may be configured to analyze the Payload data in the encrypted token data for use, and respond to successful login to the application 401.

Figure 5:
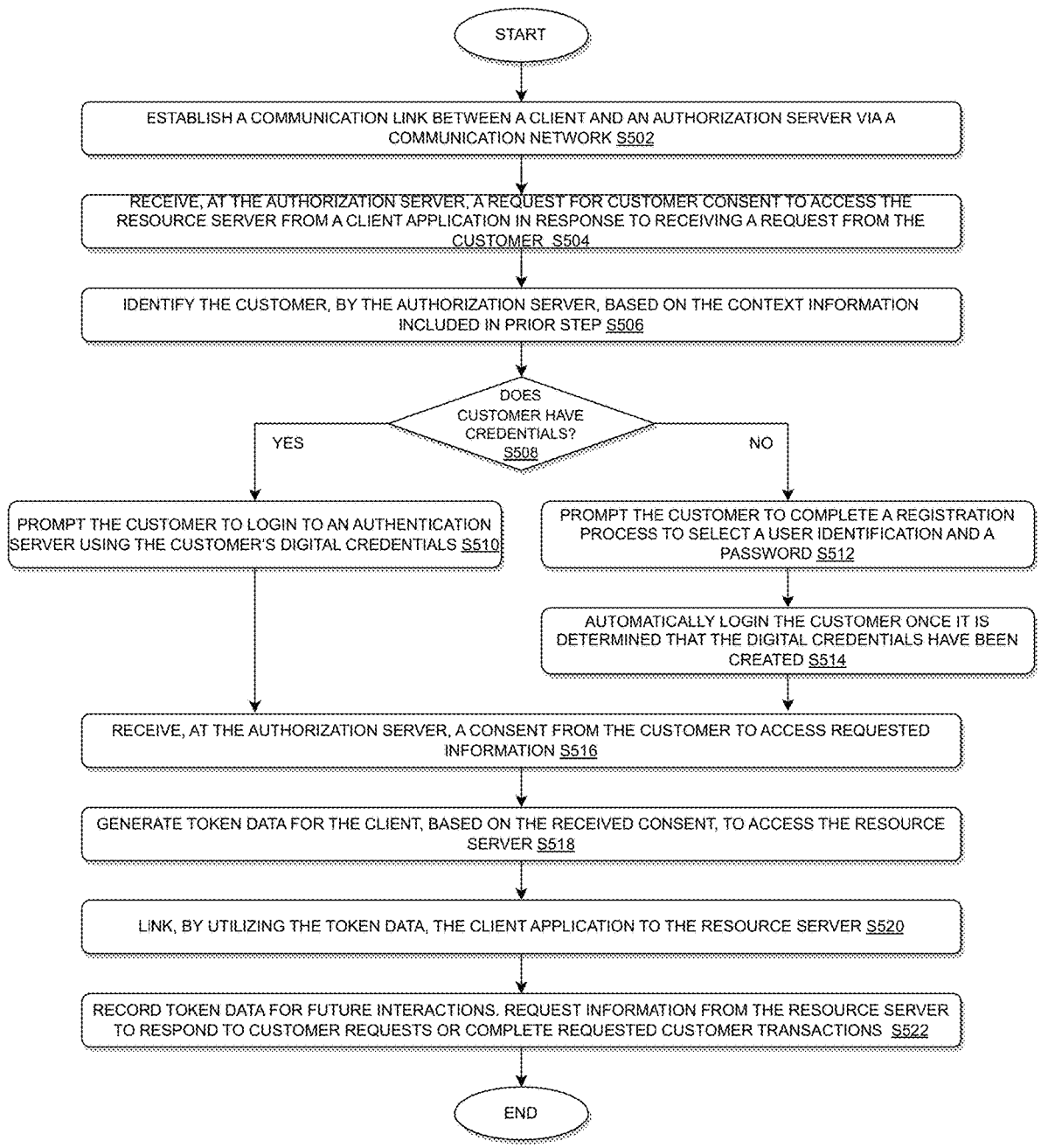
FIG. 5 illustrates an exemplary flow diagram implemented by the platform, language, database, and cloud agnostic OAuth or OIDC optimized registration module of FIG. 4 for optimizing user experience for a customer who is interacting with an authorization server in accordance with an exemplary embodiment.

FIG. 5 illustrates an exemplary flow chart illustrating a process 500 implemented by the platform, language, database, and cloud agnostic OORM 406 of FIG. 4 for optimizing user experience for a customer who is interacting with an authorization server in accordance with an exemplary embodiment. It may be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include establishing a communication link between a client and an authorization server via a communication network, wherein the resource server provides context information associated with a customer. At step S504, the process 500 may include receiving, at the authorization server, a request to access the authorization server a request for customer consent to access a resource server from a client application in response to receiving a request from the customer. Customer's agent is transferred to the authorization server in step S504. 'Client' as used in OAuth/OIDC refers to the party trying to access the customers data, not the customer or their devices. The customer's device is typically referred to as the agent.

At step S506, the process 500 may include identifying the customer, by the authorization server, based on the context information included in prior step.

At step S508, the process 500 may include determining whether the customer has credentials.

At step S508, when it is determined that the customer has credentials, the process 500 executes steps S510, S516, S518, S520, and S522 in a sequential manner as follows. At step S510, the process 500 may include prompting the customer to login to an authentication server using the customer's digital credentials. At step S516, the process 500 may include receiving, at the authorization server, a consent from the customer to access requested information. At step S518, the process 500 may include generating token data for the client, based on the received consent, to access the resource server. At step S520, the process 500 may include linking, by utilizing the token data, the client application to the resource server. And at step S522, the process 500 may include recording token data for future interactions, i.e., requesting information from the resource server to respond to customer requests or complete requested customer transactions, but the disclosure is not limited thereto.

At step S508, when it is detected that the existing customer does not have digital credentials, the process 500 executes steps S512, S514, S516, S518, S520, and S522, in a sequential manner as follows. At step S512, the process 500 may include prompting the customer to complete a registration process to create digital credentials by selecting a user identification and a password. At S514, the process 500 may include automatically login the customer once it is determined that the digital credentials have been created. At step S516, the process 500 may include receiving, at the authorization server, a consent from the customer to access requested information. At step S518, the process 500 may include generating token data for the client, based on the received consent, to access the resource server. At step S520, the process 500 may include linking, by utilizing the token data, the client application to the resource server. And at step S522, the process 500 may include recording token data for future interactions, i.e., requesting information from the resource server to respond to customer requests or complete requested customer transactions, but the disclosure is not limited thereto.

According to exemplary embodiments, in the process 500, the authorization server may be an OAuth authorization server including one or more hardware processors and memories.

According to exemplary embodiments, the process 500 may further include implementing an OpenID Connect (OIDC) protocol to login.

According to exemplary embodiments, the process 500 may further include encrypting Payload data contained in the token data by using preset authentication information; and transmitting the encrypted token data to the client application.

According to exemplary embodiments, the process 500 may further include receiving the encrypted token data through the client application; decrypting the encrypted token data by using preset authentication information; and analyzing the Payload data in the encrypted token data for use, and responding to successful login to the customer application.

According to exemplary embodiments, in the process 500, the digital credentials may include user login and password or biometric identifier associated with the customer, but the disclosure is not limited thereto.

FIG. 6 illustrates an exemplary flow diagram 600 of accessing resources implemented by the platform, language, database, and cloud agnostic OORM 406 of FIG. 4 in accordance with an exemplary embodiment.

According to exemplary embodiments, the exemplary flow diagram 600 may include steps 1-11. As illustrated in FIG. 6, at step 1 of the flow diagram 600, a resource owner/customer 602 may interact with an agent 604 (i.e., the agent may be a browser or a native application). At step 2 of the flow diagram 600, the agent 604 may, in response to the interaction with the customer 602, make a request to a client application (i.e., client 606). At step 3 of the flow diagram 600, the client application (i.e., client 606) may determine that it does not have authorization for accessing a resource (i.e., resources 618), and therefore, redirects the agent 604 to resources authorization server (i.e., authorization server 608) to obtain access. In response to step 3, at step 4, the agent 604 may request authorization from the authorization server 608 with additional customer context. In response to step 4, at step 5 of the flow diagram 600, the authentication server 608 may prompt the customer 602 to authenticate or register (if previously did not have credentials). In response to step 5, at step 6 of the flow diagram 600, customer 602 may authenticate or register accordingly by utilizing the registration module 610. In response to step 6, at step 7 (which may be optional) of the flow diagram 600, the authorization server 608 may request consent from the customer 602. In response to step 7, at step 8 of the flow diagram 600, the customer 602 may provide consent by utilizing the authorization/consent module 614. In response to step 8, at step 9 of the flow diagram 600, the authorization server 608 may return authorization code to the client 606 by utilizing the authentication module 612. In response to step 9, at step 10 of the flow diagram 600, the client 606 may request access token for the resources 618 from the authorization server 608 presenting authorization code (representing customer consent), and in response, the authorization server 608 may return a token. In response to step 10, at step 11 of the flow diagram 600, the client 606 may access the resources 618 via the resource server 616. The resource server 616 allows the client 606 to access the resources 618 after the resource server 616 validates the token.

According to exemplary embodiments, the OORD 402 may include a memory (e.g., a memory 106 as illustrated in FIG. 1) which may be a non-transitory computer readable medium that may be configured to store instructions for implementing a platform, language, database, and cloud agnostic OORM 406, for optimizing user experience during interaction with an authorization server as disclosed herein. The OORD 402 may also include a medium reader (e.g., a medium reader 112 as illustrated in FIG. 1) which may be configured to read any one or more sets of instructions, e.g., software, from any of the memories described herein. The instructions, when executed by a processor embedded within the OORM 406, or within the OORD 402, may be used to perform one or more of the methods and processes as described herein. In a particular embodiment, the instructions may reside completely, or at least partially, within the memory 106, the medium reader 112, and/or the processor 104 (see FIG. 1) during execution by the OORD 402.

According to exemplary embodiments, the instructions, when executed, may cause a processor embedded within the OORM 406, or the OORD 402 to perform the following: establishing a communication link between an authorization server and a resource server via a communication network, wherein the resource server provides context information associated with a customer; receiving, at the authorization server, a request to access the resource server from a client application in response to receiving a request from the customer to complete a transaction corresponding to a product offered at a website linked to the client application; identifying the customer, by the authorization server, based on the context information; and detecting, by the authorization server, in response to identifying, whether the customer has digital credentials or not. The processor may be the processor 104 as illustrated in FIG. 4.

According to exemplary embodiments, when it is determined that the customer is an existing customer for the customer application and has digital credentials, the instructions, when executed, may further cause the processor 104 to perform the following: prompting the customer to login to an authentication server using the customer's digital credentials; digitally executing an electronic data sharing agreement between the customer and a service provider of the customer application as to how to share information; receiving, at the authorization server, a consent from the customer based on verifying that the customer's digital credentials are correct to login to the authentication server; generating token data for the client application, based on the received consent, to access the resource server. The client application may, by using the token, access the resource server for any data or transactions consented to by the customer.

According to exemplary embodiments, when it is determined that the customer is an existing customer for the customer application who does not have digital credentials, the instructions, when executed, may further cause the processor 104 to perform the following: prompting the customer to complete a registration process to create digital credentials for the customer to login to the authentication server; automatically login the customer once it is determined that the digital credentials have been created; executing an electronic data sharing agreement that binds the customer and a service provider of the customer application as to how to share information; receiving, at the authorization server, a consent from the customer based on verifying that the customer's created digital credentials are correct to login to the authentication server; generating token data for the client application, based on the received consent, to access the resource server.

According to exemplary embodiments, when it is determined that the customer is not an existing customer for the customer application, the instructions, when executed, may further cause the processor 104 to perform the following: prompting the customer to complete a registration process to select a user identification and a password; creating digital identity and associated credentials for the customer to login to the customer application and the resource server based on the user identification and the password; executing an electronic data sharing agreement that binds the customer and a service provider of the customer application and the resource server as to how to share information; automatically login the customer to login to the customer application and the resource server once it is determined that the digital identity and associated credentials have been created; receiving, at the authorization server, a consent from the customer based on verifying that the customer's created digital identity and associated credentials are correct to login to the customer application and the resource server; generating the token data for the client application, based on the received consent, to access the resource server to obtain the context information associated with the customer; linking, by utilizing the token data, the client application to the resource server; and automatically completing, in response to the linking, the transaction corresponding to the product.

According to exemplary embodiments, the instructions, when executed, may cause the processor 104 to further perform the following: implementing an OIDC protocol to login.

According to exemplary embodiments, the instructions, when executed, may cause the processor 104 to further perform the following: encrypting Payload data contained in the token data by using preset authentication information; and transmitting the encrypted token data to the client application.

According to exemplary embodiments, the instructions, when executed, may cause the processor 104 to further perform the following: receiving the encrypted token data through the client application; decrypting the encrypted token data by using preset authentication information; and analyzing the Payload data in the encrypted token data for use, and responding to successful login to the customer application.

According to exemplary embodiments as disclosed above in FIGS. 1-6, technical improvements effected by the instant disclosure may include a platform for implementing a platform, language, database, and cloud agnostic OAuth or OIDC optimized registration module configured to optimize user experience for a customer who is interacting with an authorization server for the first time, reduce customer friction, and establish early engagement for customers who do not have credentials to complete a registration flow to provision credentials, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for optimizing user experience during interaction with an authorization server by utilizing one or more processors along with allocated memory, the method comprising:
    establishing a communication link between a client and an authorization server via a communication network, wherein a resource server provides context information associated with a customer;
    receiving, at the authorization server, a request for customer consent to access the resource server from a client application in response to receiving a request from the customer;
    identifying the customer, by the authorization server, based on the context information;
    detecting, by the authorization server, in response to identifying, whether the customer has digital credentials or not;
    upon determining that the customer has digital credentials, the method further comprising:
    prompting the customer to login to an authentication server using the customer's digital credentials;
    upon determining that the customer is an existing customer for a customer application who does not have digital credentials, the method further comprising:
    prompting the customer to complete a registration process to create digital credentials by selecting a user identification and a password;
    automatically login the customer upon determining that the digital credentials have been created;
    receiving, at the authorization server, a consent from the customer to access requested information;
    generating token data for the client, based on the received consent, to access the resource server;
    linking, by utilizing the token data, the client application to the resource server; and
    recording the token data for future interactions.

2. The method according to claim 1, wherein the authorization server is an OAuth authorization server including one or more hardware processors and memories.

3. The method according to claim 2, further comprising: implementing an OpenID Connect (OIDC) protocol to login.

4. The method according to claim 2, further comprising: encrypting payload data contained in the token data by using preset authentication information; and
    transmitting the encrypted token data to the client application.

5. The method according to claim 4, further comprising: receiving the encrypted token data through the client application;
    decrypting the encrypted token data by using preset authentication information; and
    analyzing the payload data in the encrypted token data for use, and responding to successful login to the customer application.

6. The method according to claim 1, wherein the digital credentials include user login and password or biometric identifier associated with the customer.

7. The method according to claim 1, upon determining that the customer is not an existing customer for the customer application, the method further comprising:
    prompting the customer to complete a registration process to select a user identification and a password;
    creating digital identity and associated credentials for the customer to login to the resource server based on the user identification and the password;
    automatically login the customer upon determining that the digital identity and associated credentials have been created;
    executing an electronic data sharing agreement that binds the customer and an owner of the resource server as to how to share information;
    receiving, at the authorization server, a consent from the customer based on verifying that the customer's created digital identity and associated credentials are correct to login to the resource server;
    generating the token data for the client application, based on the received consent, to access the resource server to obtain the context information associated with the customer;
    linking, by utilizing the token data, the client application to the resource server; and
    automatically completing, in response to the linking, a transaction corresponding to a product.

8. A system for optimizing user experience during interaction with an authorization server, the system comprising:
    a processor; and
    a memory operatively connected to the processor via a communication interface, the memory storing computer readable instructions, when executed, causes the processor to:
    establish a communication link between a client and an authorization server via a communication network, wherein a resource server provides context information associated with a customer;
    receive, at the authorization server, a request for customer consent to access the resource server from a client application in response to receiving a request from the customer;
    identify the customer, by the authorization server, based on the context information;
    detect, by the authorization server, in response to identifying, whether the customer has digital credentials or not;
    upon determining that the customer has digital credentials, the processor is further configured to:

prompt the customer to login to an authentication server using the customer's digital credentials;

upon determining that the customer is an existing customer for a customer application who does not have digital credentials, the processor is further configured to:

prompt the customer to complete a registration process to create digital credentials by selecting a user identification and a password;

automatically login the customer upon determining that the digital credentials have been created;

receive, at the authorization server, a consent from the customer to access requested information;

generate token data for the client, based on the received consent, to access the resource server;

link, by utilizing the token data, the client application to the resource server; and record the token data for future interactions.

9. The system according to claim 8, wherein the authorization server is an OAuth authorization server including one or more hardware processors and memories.

10. The system according to claim 9, wherein the processor is further configured to:

implement an OpenID Connect (OIDC) protocol to login.

11. The system according to claim 9, wherein the processor is further configured to:

encrypt payload data contained in the token data by using preset authentication information; and transmit the encrypted token data to the client application.

12. The system according to claim 11, wherein the processor is further configured to:

receive the encrypted token data through the client application;

decrypt the encrypted token data by using preset authentication information; and analyze the payload data in the encrypted token data for use, and respond to successful login to the customer application.

13. The system according to claim 8, wherein the digital credentials include user login and password or biometric identifier associated with the customer.

14. The system according to claim 8, upon determining that the customer is not an existing customer for the customer application, the processor is further configured to:

prompt the customer to complete a registration process to select a user identification and a password;

create digital identity and associated credentials for the customer to login to the resource server based on the user identification and the password;

automatically login the customer upon determining that the digital identity and associated credentials have been created;

execute an electronic data sharing agreement that binds the customer and an owner of the resource server as to how to share information;

receive, at the authorization server, a consent from the customer based on verifying that the customer's created digital identity and associated credentials are correct to login to the resource server;

generate the token data for the client application, based on the received consent, to access the resource server to obtain the context information associated with the customer;

link, by utilizing the token data, the client application to the resource server; and automatically complete, in response to the linking, a transaction corresponding to a product.

15. A non-transitory computer readable medium configured to store instructions for optimizing user experience during interaction with an authorization server, the instructions, when executed, cause a processor to perform the following:

establishing a communication link between a client and an authorization server via a communication network, wherein a resource server provides context information associated with a customer;

receiving, at the authorization server, a request for customer consent to access the resource server from a client application in response to receiving a request from the customer;

identifying the customer, by the authorization server, based on the context information;

detecting, by the authorization server, in response to identifying, whether the customer has digital credentials or not;

upon determining that the customer has digital credentials, the method further comprising:

prompting the customer to login to an authentication server using the customer's digital credentials;

upon determining that the customer is an existing customer for a customer application who does not have digital credentials, the instructions, when executed, cause the processor to further perform the following:

prompting the customer to complete a registration process to create digital credentials by selecting a user identification and a password;

automatically login the customer upon determining that the digital credentials have been created;

receiving, at the authorization server, a consent from the customer to access requested information;

generating token data for the client, based on the received consent, to access the resource server;

linking, by utilizing the token data, the client application to the resource server; and recording the token data for future interactions.

16. The non-transitory computer readable medium according to claim 15, wherein the authorization server is an OAuth authorization server including one or more hardware processors and memories, and wherein the instructions, when executed, cause the processor to further perform the following:

implementing an OpenID Connect (OIDC) protocol to login.

17. The non-transitory computer readable medium according to claim 16, wherein the instructions, when executed, cause the processor to further perform the following:

encrypting payload data contained in the token data by using preset authentication information; and transmitting the encrypted token data to the client application.

18. The non-transitory computer readable medium according to claim 17, wherein the instructions, when executed, cause the processor to further perform the following:

receiving the encrypted token data through the client application;

decrypting the encrypted token data by using preset authentication information; and analyzing the payload data in the encrypted token data for use, and responding to successful login to the customer application.

19. The non-transitory computer readable medium according to claim 15, wherein the digital credentials include user login and password or biometric identifier associated with the customer.

20. The non-transitory computer readable medium according to claim 15, upon determining that the customer is not an existing customer for the customer application, the instructions, when executed, cause the processor to further perform the following:
- prompting the customer to complete a registration process to select a user identification and a password;
- creating digital identity and associated credentials for the customer to login to the resource server based on the user identification and the password;
- automatically login the customer upon determining that the digital identity and associated credentials have been created;
- executing an electronic data sharing agreement that binds the customer and an owner of the resource server as to how to share information;
- receiving, at the authorization server, a consent from the customer based on verifying that the customer's created digital identity and associated credentials are correct to login to the resource server;
- generating the token data for the client application, based on the received consent, to access the resource server to obtain the context information associated with the customer;
- linking, by utilizing the token data, the client application to the resource server; and
- automatically completing, in response to the linking, a transaction corresponding to a product.

* * * * *